W. R. McDONALD.
Pedal-Mechanism.
No. 213,767.    Patented April 1, 1879.
Fig. 1.
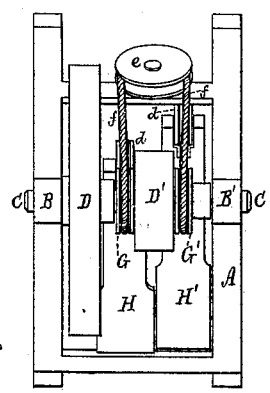
Fig. 3.
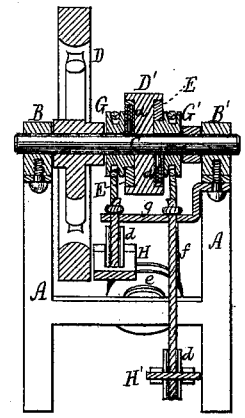
Fig. 2.
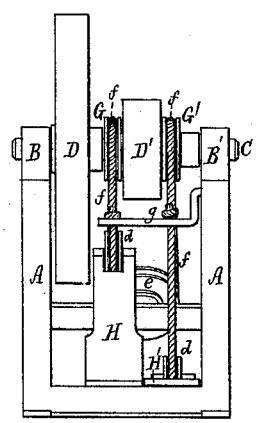
Fig. 4.
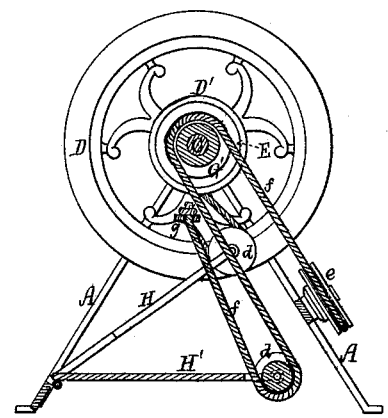
Fig. 5.    Fig. 6.    Fig. 7.    Fig. 8.
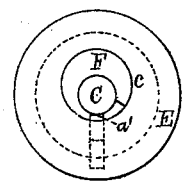 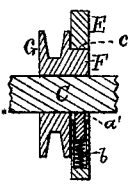  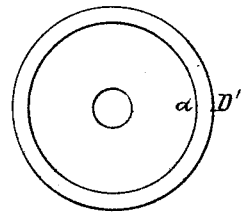
Witnesses:
S. N. Piper
John Birkenhead
Inventor
Wm. R. McDonald
by attorney.

UNITED STATES PATENT OFFICE.

WILLIAM R. McDONALD, OF CALAIS, MAINE.

IMPROVEMENT IN PEDAL MECHANISMS.

Specification forming part of Letters Patent No. 213,767, dated April 1, 1879; application filed November 11, 1878.

*To all whom it may concern:*

Be it known that I, WILLIAM R. McDONALD, of Calais, of the county of Washington and State of Maine, have invented a new and useful Pedal Mechanism for Imparting Rotary Motion to a Shaft; and do hereby declare the same to be described in the following specification and represented in the accompanying drawings, of which—

Figure 1 is a top view, Fig. 2 a front elevation, Fig. 3 a longitudinal section, and Fig. 4 a transverse section, of a shaft and pedals provided with my invention. Fig. 5 is a side view, and Fig. 6 a cross-section, of one of the friction-clutches and its driving-shaft. Fig. 7 is a transverse section, and Fig. 8 an end view, of the shaft-wheel to which the two clutches are applied, and which are operated by them.

My invention consists, first, in a friction-clutch composed of a recessed eccentric, a disk, and a friction brake or pin and spring, in combination with a pedal, a band, a loose wheel, and a fixed wheel, all constructed, arranged, and combined substantially as set forth; second, in a band fastened at its ends, and its three guide-wheels arranged and combined with a frame, two pedals, and two loose wheels and their clutches, as described, applied to a shaft and to a wheel fixed thereto, all being essentially as described and represented; third, in the combination of a shaft-wheel, two friction-clutches, as described, two band-wheels, and a band, its guiding-wheels and pedals, arranged together and applied to a shaft and its supporting-frame, substantially as specified and represented.

The machine is specially designed for operating the driving-shaft of a sewing-machine, or that of a scroll-saw, to which it may be directly applied, or to the shaft hereinafter mentioned. It saves the necessity of the usual pulleys and endless belt usually employed in what are termed "treadle-motions," serving to operate the shaft to be driven by the driving-shaft of such a motion.

In the drawings, A denotes a frame for supporting in boxes B B' a shaft, C, provided with a fly-wheel, D. At or near its middle there is fixed on such shaft what I term the "shaft-wheel D'," which is flanged or has a circular chamber, $a$, in each of its opposite sides, such chamber being concentric with the wheel. Within each of the said chambers is a friction-clutch composed of a disk, E, recessed eccentric F, and friction-brake, consisting of a pin, $a'$, and spring $b$.

The disk E has a circular hole, $c$, made through it eccentrically. This hole corresponds in diameter with that of the eccentric F, which is placed within it. The said eccentric, crescent-shaped or recessed, and formed in manner as represented, is fixed to and projects from the side of one of the two band-wheels G G', arranged as shown, and turning loosely upon the shaft C. Each of the grooved wheels G G' has an eccentric, F, fixed to it, and to each of these eccentrics there is a disk, E. The wheels G G' have the shaft-wheel between them. The pin $a'$ slides radially in the disk, E, and is pressed endwise against the shaft by the spring $b$, arranged in the disk.

Below the shaft C are two pedals, H H', which, at their rear ends, are hinged to the frame A. Each pedal carries at its front end a grooved guide-wheel, $d$. Above the said guide-wheels, and supported on a pivot projecting from the frame, is another guide-wheel, $e$. A band, $f$, at its middle is carried under and partly around the middle guide-wheel, $e$; thence over and partially around the band-wheels G G'; thence down under and partially around the guide-wheels $d\ d$ of the two pedals, and thence upward to and has its ends secured to a stationary arm, $g$, arranged underneath the shaft, all being as represented.

On applying the feet to the two pedals and moving them down alternately, a continuous rotation in one direction will be imparted to the shaft C. While each pedal is being moved down, the band-wheel G or G' that may be directly over it will be turned in one direction, and the other or fellow wheel will be revolved in the opposite one. This will cause the eccentric of the first wheel to turn in a manner to force the periphery of its disk hard against the inner periphery of the disk-chamber of the central wheel, so as to clutch the band-wheel to the central wheel, and thereby cause the latter and the shaft to revolve with the band-wheel. In the meantime the other band-wheel, revolving the opposite way, will cause its eccentric to unclutch the disk thereof from the periphery of the disk-chamber of the central wheel, and revolve back the disk a distance sufficient for it at the commencement of the next movement to clutch it to the central wheel.

It should be observed that the friction brake or pin, by bearing against the shaft and extending into the opening of the eccentric, affords the necessary friction to the disk to enable the eccentric to turn back therein sufficiently to effect the unclutching of the disk and center-wheel. Thus, in going one way each disk is forced against the surrounding flange of the central wheel, and in going the other is first drawn away from the flange, and subsequently, by the action of the eccentric against the piston-brake or drag-pin extending into such eccentric, is revolved in the proper direction to set it back to the extreme of its rearward movement.

My pedal mechanism differs materially from that shown in the United States Patent No. 206,952, inasmuch as I do not use ratchet-wheels and lever-pawls and four disks to carry and operate such pawls, in the operating of which much noise or clatter is occasioned by the pawls striking the teeth of the wheels.

My mechanism is simpler in construction, and practically noiseless and certain in operation. In the place of two gear-wheels, I use a single wheel, D', chambered in its opposite sides, and with such two eccentrically-perforated disks, E, and two eccentrics, F, and two friction-pins, a', provided with springs b, all being arranged and applied to the shaft C and the loose-band wheels G G' thereof, as set forth.

I claim as my invention as follows:

1. The friction-clutch of each of the loose wheels G G', and the fixed or shaft wheel D', in combination with said loose wheel and shaft-wheel, and with the pedal and band of said loose wheel, such clutch consisting of the recessed eccentric F, the disk E, and the friction brake or pin a' and spring b, all being constructed, arranged, and applied substantially as set forth.

2. The combination of the duplex chambered wheel D', fastened on the shaft C, with the eccentrically-holed disks E, the eccentrics F, and two friction-pins, a', and their springs b, all being arranged with and applied as represented to the said shaft, and the two band-wheels G G' adapted to revolve thereon, and provided with a band and its operative pedals and guide-wheels, as set forth.

WM. R. McDONALD.

Witnesses:
 GEO. R. GARDNER,
 LEVI L. LOWELL.